United States Patent [19]
Horsch

[11] 3,982,618
[45] Sept. 28, 1976

[54] BRAKE PROVIDED WITH GRAVITY-FEED AUTOMATIC SUPPLEMENTARY-COOLING CONTROL

[75] Inventor: Joachim Horsch, Lombard, Ill.

[73] Assignee: International Harvester Company, Chicago, Ill.

[22] Filed: Oct. 24, 1975

[21] Appl. No.: 625,450

[52] U.S. Cl. .......................... 192/113 B; 192/18 A; 188/264 E
[51] Int. Cl.² .................... F16D 67/04; F16D 13/72
[58] Field of Search ................ 192/113 B, 57, 58 B, 192/58 C, 18 A, 70.12; 188/264 E, 264 P

[56] References Cited
UNITED STATES PATENTS

| | | | |
|---|---|---|---|
| 3,292,758 | 12/1966 | Polak | 192/113 B |
| 3,494,450 | 2/1970 | Mankowsky et al. | 192/113 X |
| 3,924,715 | 12/1975 | Cory | 192/113 X |

*Primary Examiner*—Benjamin W. Wyche
*Attorney, Agent, or Firm*—John W. Gaines; Floyd B. Harman

[57] ABSTRACT

A brake with multiple friction plates supplied with both a steady, plate cooling and lubrication flow, and a controlled supplemental flow specially provided therefor. The specially provided flow is delivered onto, and leaves from, the friction plates being cooled thereby, under automatic control when needed, by utilization and adaptation of a simple gravity head and of operating parts already at hand in a standard traction drive mechanism.

14 Claims, 7 Drawing Figures

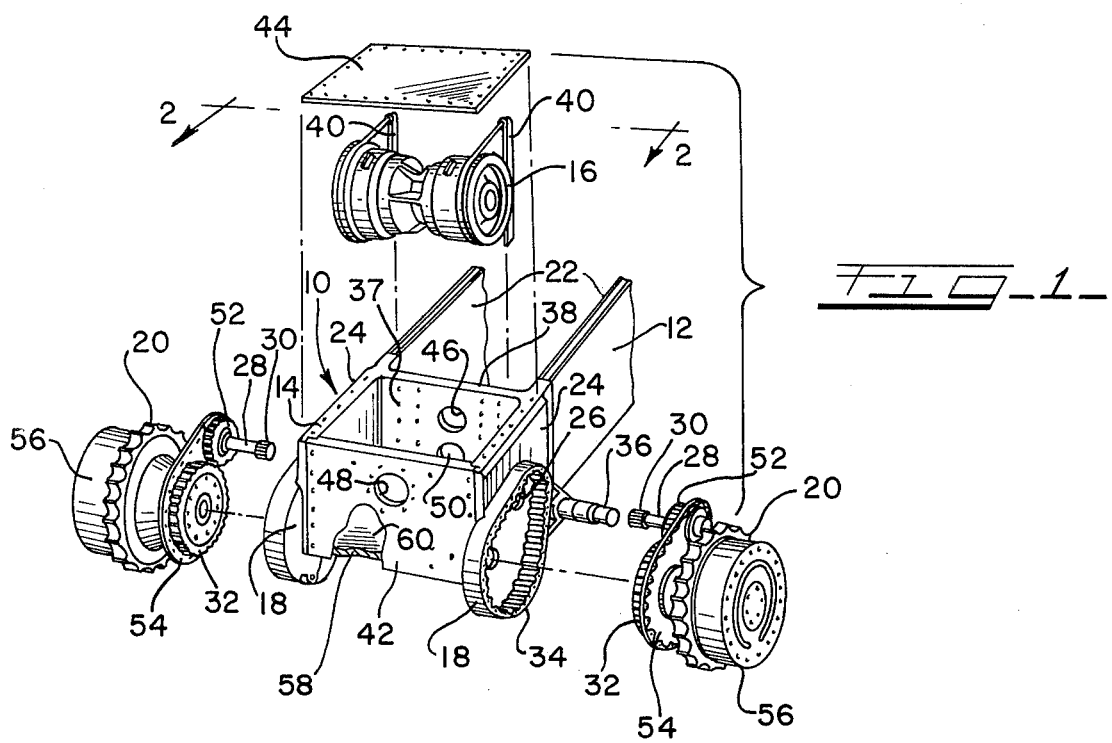
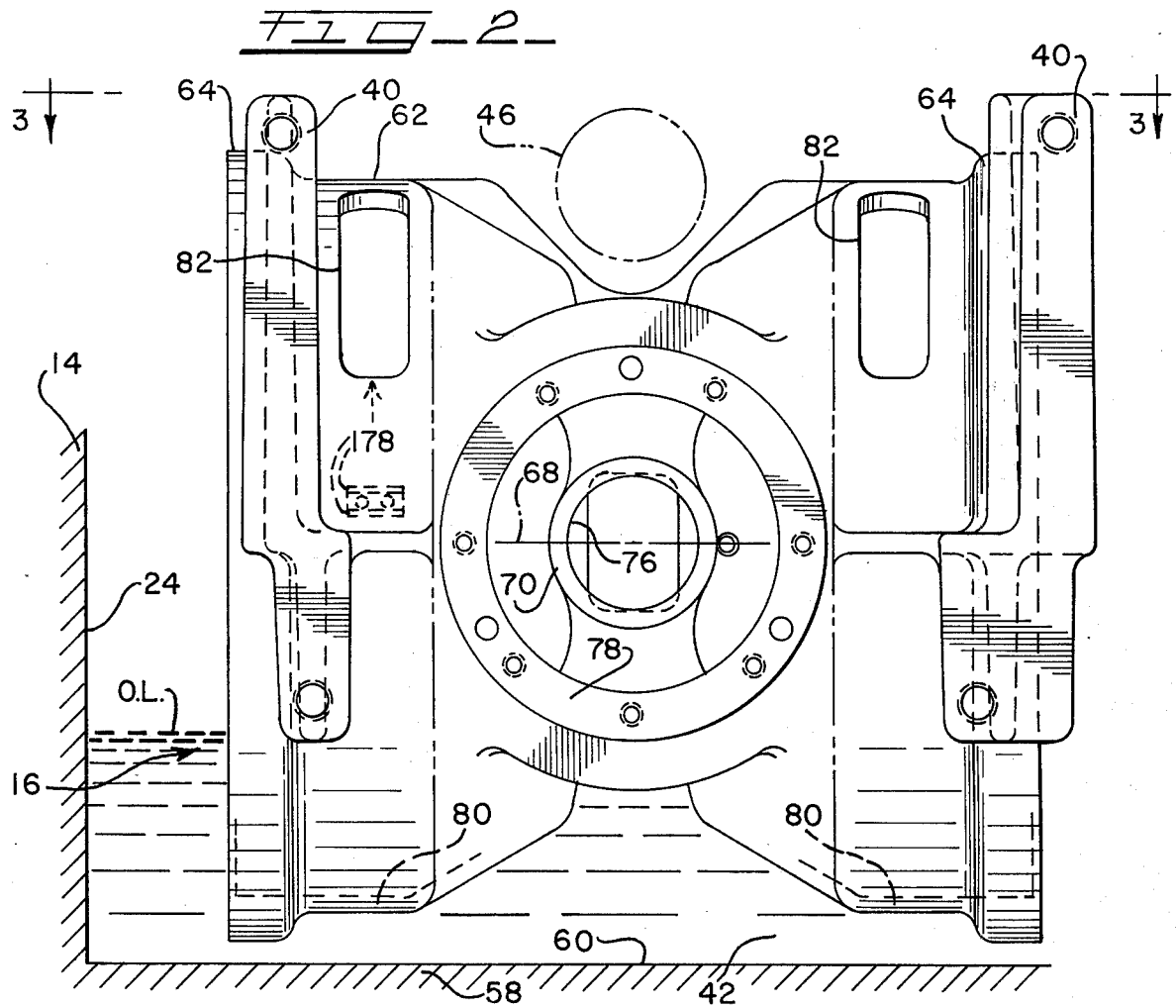

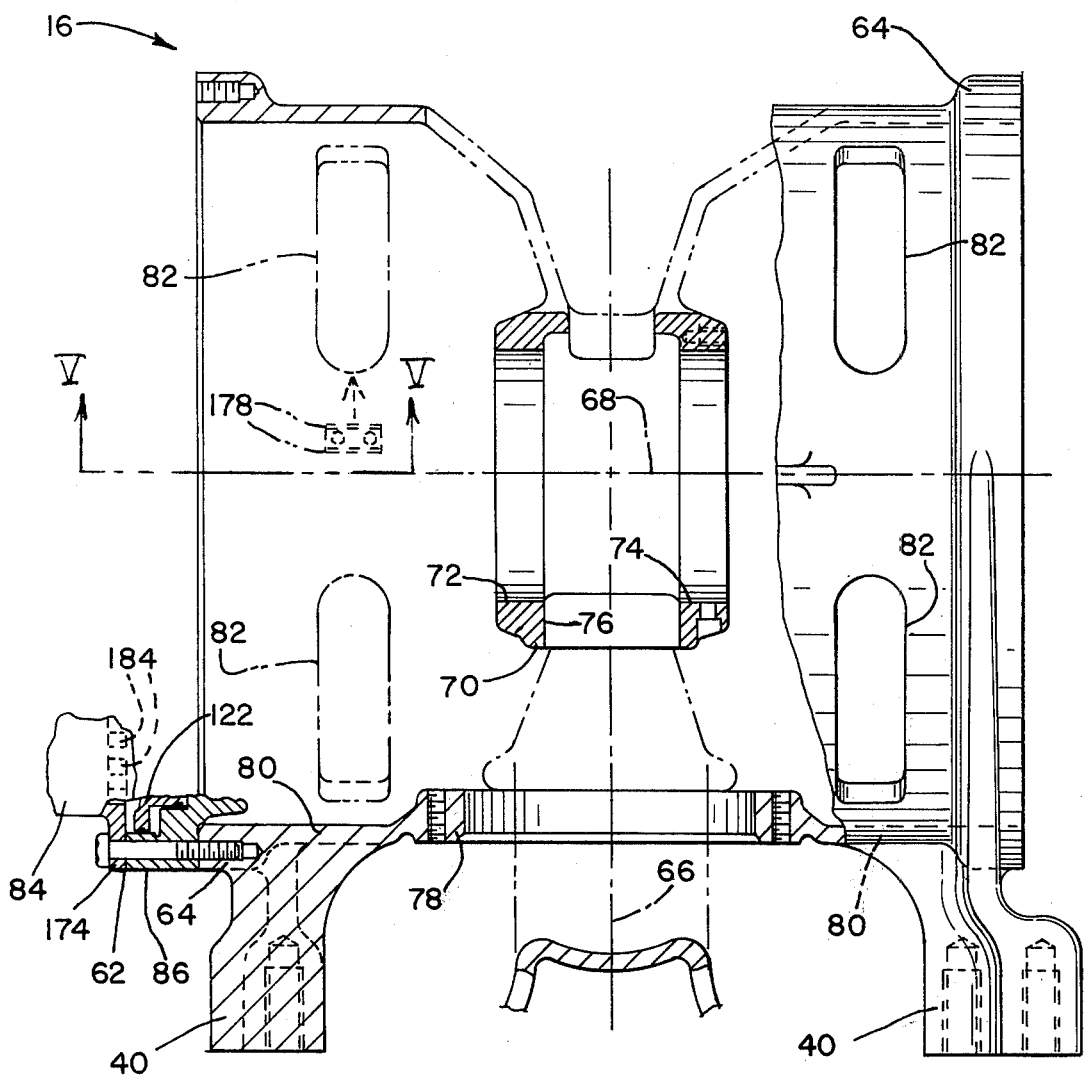

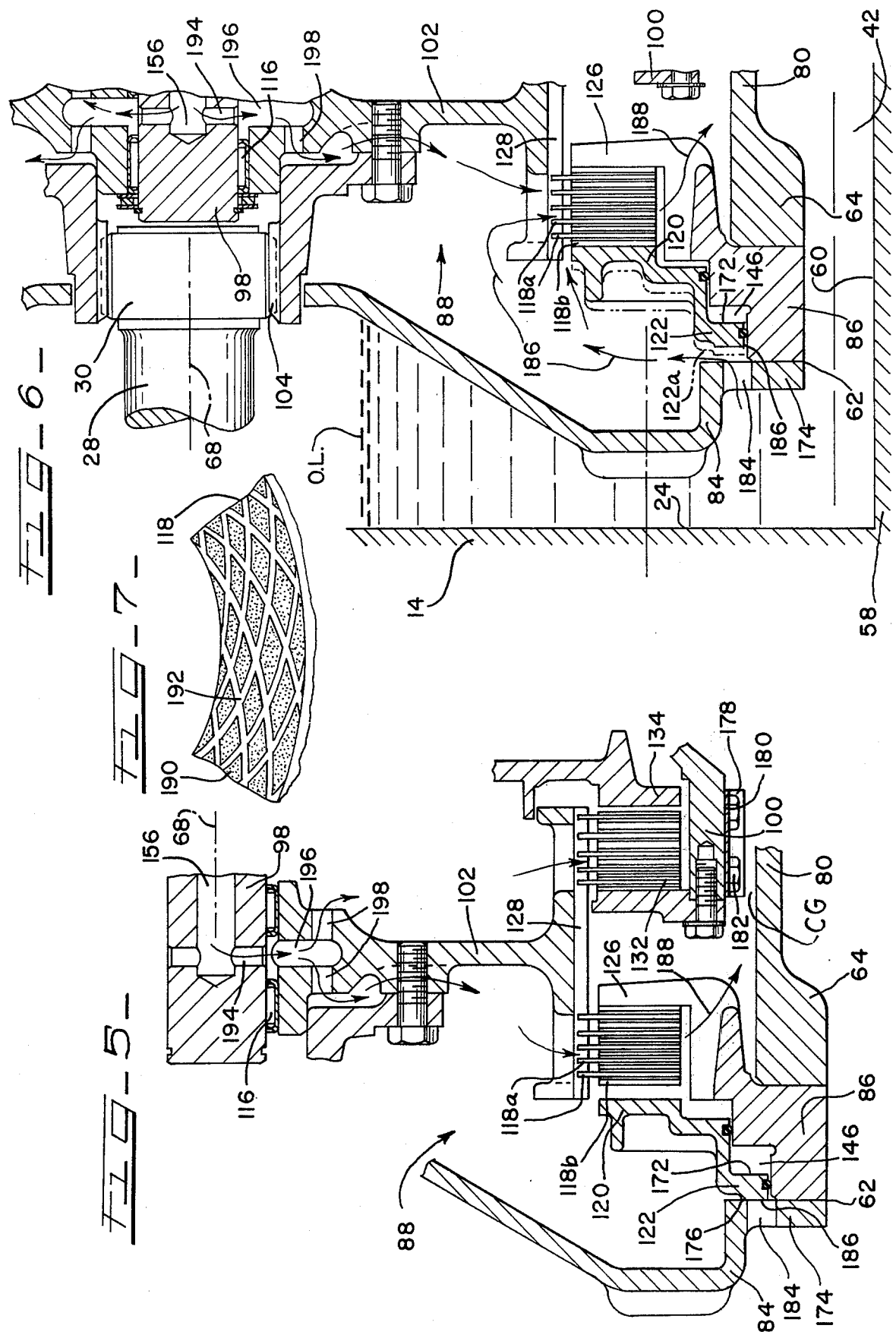

BRAKE PROVIDED WITH GRAVITY-FEED AUTOMATIC SUPPLEMENTARY-COOLING CONTROL

This application relates to clutch-brake steering drive mechanism, and particularly to a cooling control providing two rates of cooling and lubrication flow to multiple friction disks therein, both during their engagement, and in moving to and fro with respect to their engaged position. Engagement and release produce heat from friction, and the flow of oil serves the purposes of cooling the disks and of providing for smooth engagement and release thereof.

One appication for steering drive mechanism is in crawler vehicles; crawler tractors are particularly contemplated here because of prevalence of brake packs and clutch packs in the design of their transmissions and steering drives. A steering drive mechanism in a crawler tractor has special significance in connection with my invention when the steering drive housing operates internally on a dry sump principle even though primarily adapted for installation within a wet sump formed in the so-called rear main frame of the crawler.

It is known to cool and lubricate the multiple friction disks present in a brake plate pack or a clutch plate pack, and to do so at varying flows of the oil used. Added accessory mechanism can be provided as a means of bringing about the foregoing but requires provision of its own drive shaft for generating the oil flow required; or, more directly, lube lines can be tapped or the brake or clutch cylinder actuating lines can be tapped for generating the oil flow. In my view, an improved manner of generating the flow needs to be introduced, with the object being to utilize two rates, one flow of which is generated and controlled entirely differently from the other.

It is therefore an object of my invention to provide a flow of force-feed oil to brake plates at a constant low rate, and a large supplemental flow automatically thereto at a controlled high rate; such supplemental flow is produced simply under a gravity head of oil pressure, and simply by utilization and adaptation of operating parts already at hand in a regular traction drive mechanism. In this manner as will now be explained in detail, an extra accessory unit and accessory drive shaft are unneeded in the design, and at the same time pressure in the lube lines or cylinder actuating lines is not required from time to time to be tapped off and diverted, in order to satisfy the demand for the large supplemental oil flow needed.

Various features, objects, and advantages will either be specifically pointed out or become apparent when, for a better understanding of my invention, reference is made to the following description taken in conjunction with the accompanying drawings which show a preferred embodiment thereof, and in which:

FIG. 1 is an isometric three-quarters rear view of a crawler tractor frame, exploded so as to expose the steering drive, complete with its housing and associated traction components;

FIGS. 2 and 3 are front elevational and top plan views of the steering drive housing with the showing of FIG. 4 removed for clarity, FIG. 2 as seen from the direction of the arrows of line II — II of FIG. 1, and FIG. 3 as seen from the direction of the arrows of line III — III of FIG. 2;

Figure 4:
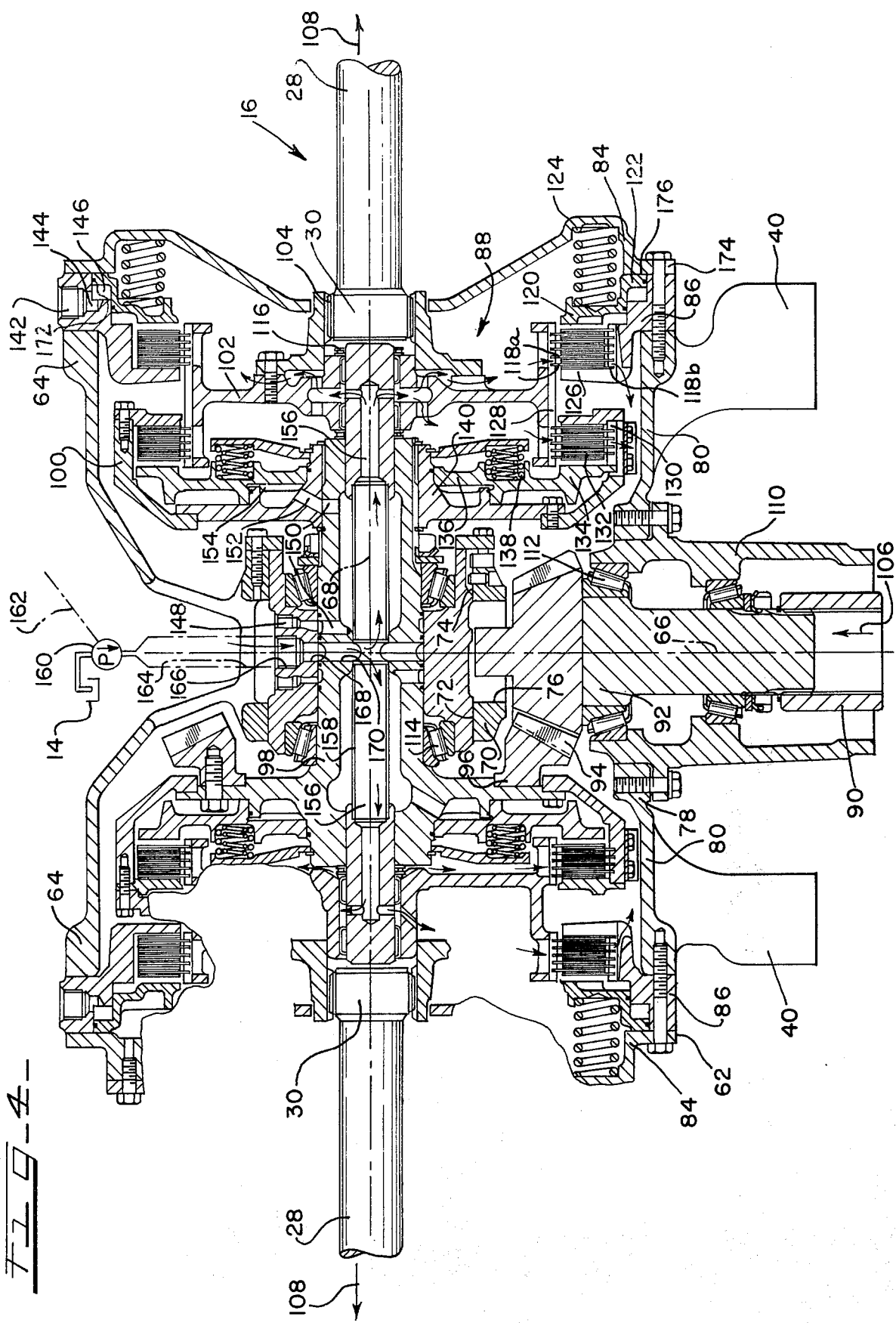
FIG. 4 is a complete view, in top plan like FIG. 3.

FIGS. 5 and 6 are transverse elevational cross sectional showings through the bottom of the housing as viewed along the line V — V in FIG. 3, showing the respective conditions in the bottom of the housing when a vehicle disk brake therein is hydraulically respectively released and engaged; and FIG. 7 is a fragmentary elevational view showing the interlaced pattern of grooves present in each face of a typical brake disk.

More particularly in FIG. 1, the frame of a crawler tractor 10 is shown comprising a front section 12 and an integrally joined rear section known as a rear main frame 14 in which a steering drive 16 is located, and at the so-called elephant ears 18 of which there are located driving connections between the steering drive 16 and a pair of drive sprockets or sprocket wheels 20 located outside of the rear main frame 14 for driving endless track assemblies, not shown. The front section 12 of the tractor frame has two sides 22, each formed by sheets so as to be double walled with the sheets closely spaced apart and parallel to one another.

The rear main frame 14 is a generally rectangular steering drive box and has two sides 24 each of which is formed as a hollow wall casting with which the elephant ear 18 at that side is integrally formed. Each of the sides 24 is provided with an opening 26 to receive an output shaft 28 which, by means of its output shaft pinion 30 received in the final drive 16, forms part of a driving connection to the associated drive sprocket 20. A further part of the driving connection is constituted by a bull gear 32 adapted to be received by the adjacent elephant ear 18 within a pheripheral flange 34 of the latter.

A track frame, not shown, at each side of the tractor is pivotally supported at its rear on a transverse fixed shaft 36 in the frame at the rear of the tractor.

Bolts, not shown, are provided which extend through openings 37 in a front wall 38 of the rear main frame 14 and are received in threaded engagement in brackets 40 of the steering drive mechanism 16 for supporting same at the desired height in the rear main frame 14. A rear wall 42 of the rear main frame 14 is secured to the rear of the sides 24 by welding. The top of the rear main frame 14 is closed by a top plate 44 which is bolted thereupon.

A pair of aligned openings 46 and 48 in the respective front and rear main frame walls 38 and 42 accommodates power take-off shafting, not shown, leading from a tractor transmission, not shown, rearwardly to the rear of the tractor. Below the opening 46, a transmission shaft opening 50 is formed in the front wall 38 to accommodate the universal joint shafting, not shown, between the steering drive 16 which is rearwardly disposed and the tractor transmission, not shown, which is disposed immediately forwardly thereof.

At each side of the rear main frame 14, a pinion 52 meshing with the bull gear 32 establishes one of the final drive gear reductions from the output shaft 28 concerned, and a cover 54 received by the elephant ear peripheral flange 34 protects the meshed gearing. The drive is completed in a planetary gear case 56 in which final drive planetary reduction gearing is provided to slowly drive the sprockets 20 at each side of the tractor 10.

STEERING DRIVE — FIG. 1 IN GENERAL

As installed, connected with the respective output shaft pinions 30, the steering drive 16 operates in one of its phases to apply braking to and to withhold braking from either or both of the outpit shafts 28 and thus effect vehicle braking and steering-by-braking the crawler. Because it is driven through the transmission shaft opening 50 by means of universal joint transmission shafting, the final drive 16 operates in another phase to apply torque to or withhold torque from either or both of the output shafts 28 and thus effect power drive of the crawler. The direction of torque application, always rotationally opposite in each of the shafts 28 from the direction of rotation of the sprocket 20 concerned, is controlled by the transmission, and also the selective gear ratios of drive. In either given direction, setting the sprockets 20 in rotation at the same speed drives the tractor in a straight line, setting the sprockets 20 in rotation at dissimilar speeds drives the crawler in a turn, and setting the sprockets 20 at rest stops the crawler.

The remaining wall 58 confronting the top plate 44 and closing off the bottom of the rear main frame 14 forms a sump bottom 60 for the latter which serves as a wet sump for a body of cooling and lubrication oil. The resulting reservoir of oil has a designed lubricant level in the rear main frame 14, keeping the latter of the order of one-quarter full and certainly less than one-half full. As that level comes into registry with the steering driven 16, the latter stays somewhat less than half immersed, perhaps one third or more immersed, in the sump oil thereabout.

STEERING DRIVE — FIGS. 2 AND 3 HOUSING

The steering drive 16 includes an external housing generally indicated at 62 and having a body with oppositely extending bells 64 which are at each side generally in the plane of the bracket 40 at that side. Generally adjacent the interection between the horizontally extending central axis 66 and main transverse axis 68 of the housing 62, the latter has a central casting portion 70 defining a coaxial span of seats 72 and 74 for a tapered roller bearing assembly and also defining a pinion shaft opening 76 (FIG. 3). A drilled and tapped attachment flange 78 of circular shape at the front of the housing 62 is provided for receiving a transmission shaft casing, not shown.

Adjacent each of the bells 64 of the housing 62, a cylindrical casing portion 80 internally defines the pathway for an uninterrupted internal annulus of fluid travel, hereinafter described, and presents a surrounding solid metal wall except for a pair of spaced apart top, slotted openings 82. The openings 82, in terms of angular measurements, have their adjacent ends approximately 15° from each side of the vertical plane through the main transverse axis 68 and have their outer ends at approximately 55° away from such plane, thus being confined to the upper half of the housing 62. Secured to each bell 64, are a housing end cover 84 and a ring-like brake cylinder 86 clamped between the end cover and the adjacent end of the bell 64 (FIG. 3) concerned.

The housing 62 of the steering drive 16 is a symmetrical casting to the extent that the halves on either side of the vertical plane through the central axis 66 (FIG. 3) are essentially mirror images of one another.

STEERING DRIVE — FIG. 4 MECHANISM

Except for a crown gear now to be described in this figure, the halves of the steering drive mechanism itself 88 are symmetrical on either side of the vertical plane through the central axis 66 to the extent that they are essentially mirror images of one another. Drive from the transmission through a splined sleeve 90 and an input pinion shaft 92 splined therein is transferred by meshing bevel gear teeth 94 to a crown gear 96 and a main shaft 98 to which the crown gear is affixed. In each side of the mechanism 88, a clutch outer casing 100 which constantly rotates and the fixed ring-like brake cylinder 86 are opposed to one another. It is through the casing 100 affixed to main shaft 98 that drive torque is applied, and through the brake cylinder 86 that brake torque is applied to a common output member 102 which is connected by splines 104 to control rotation of the shaft 28 concerned.

The drive path is indicated by an arrow 106 for the drive in and indicated by the oppositely directed arrows 108 for the drive out.

A transmission shaft casing 110 is secured by bolts to the circular attachment flange 78 of the housing, and journals the pinion shaft 92 for rotation in a tapered roller bearing assembly 112. The center section of the main shaft 98 is journalled in a tapered roller bearing assembly 114 carried in the housing seats 72 and 74 and, at each end section of the main shaft 98, the output member 102 is journalled thereon for independent rotation by means of an interposed needle roller bearing assembly 116.

The output member 102 at each side of the steering drive 16 is controlled in part by a brake with multiple disks, alternate ones 118a of which are rotatable and each remaining one 118b of which is stationary; the multiple disks function as a spring applied brake by reason of the fact that the brake pressure plate 120 carried by an hydraulic brake piston 122 is constantly biased toward the brake engaged position because of a set of brake springs 124 pressing on the opposite side of the pressure plate 120 from the multiple disks. A brake backing member 126 is integral with the ring-like brake cylinder 86. The rotating disks 118a have internal splined teeth engaging a set of external spline teeth 128 on the common output member 102. External spline teeth on the stationary disks 118b engage a companion set of internal spline teeth carried by the brake cylinder 86 adjacent the backing plate 126.

The clutch casing 100 carries a set of internal spline teeth 130 which, in cooperation with the output member splines 128, supports a set of multiple clutch disks or plates 132, alternating ones of which are rotatable with the driving casing splines 130 and each remaining one of which is rotatable with the output member splines 128. The multiple clutch disks 132 are pressure applied in conventional manner by a pressure plate 134 carried by a clutch piston 136. The clutch is spring released by means of a set of return springs 138. Interconnecting the main shaft 98 and the clutch outer casing 100 is a clutch cylinder 140.

Clutch and brake control at either side of the steering drive 16 is accomplished by conventional valves, not shown, and the connections therefrom to the steering drive housing 62 are likewise conventional. For brake release, at the right as viewed in FIG. 4, flow within the housing 62 is introduced through a threaded opening 142, through a passage 144, thence into a brake cylinder chamber 146 located within the brake cylinder 86 and controlling the brake piston 122.

For clutch application, the path of flow within the housing 62 is from a threaded manifold-inlet opening 148, through a series of radial and longitudinal shaft passages 150 in the main shaft 98, thence through a clutch cylinder passage 152 into a clutch chamber 154 controlling the clutch piston 136.

To enable it to be readily made so as to have a central passage 156 for cooling and lubrication oil, the main shaft 98 is multisectional and includes between the various sections a pair of tubes 158 separating the cooling and lubrication passage 156 from the selected clutch fluid passages 150. Flow of the cooling and lubrication oil from its wet sump source, the rear main frame 14, is in a path from a pump 160 having a driving connection 162, an introduction line 164 through the steering drive housing 62, a threaded manifold opening 166, and a pair of passages 168 and 170 leading radially through the manifold and the main shaft 98 into the shaft central passage 156. The pump driving connection 162 represents a gear drive connected to the main shaft 98.

BRAKING DETAILS — FIGS. 4, 5, AND 6

In connection with the previously described operation of the spring applied brake, each brake piston 122 presents a face at the side of the brake chamber 146 defining a pressure movable area 172 which, when pressurized, is effective to cause friction brake releasing movement in a way overcoming the biasing springs 124 and in a direction toward the radial attachment flange 174 of the end cover formin part of the housing wall. During such movement, another face of the piston 122 at its other side is effective as a bumper part 176 to bump against the housing wall as a stop.

Opposite movement, to bring about brake engagement, is illustrated in FIG. 6, caused by collapse of the cylinder chamber 146 and compression of the rotatable and stationary brake disks 118a and 118b into a compact stack by the pressure plate 120. A broken line position of the piston as shown by the broken lines 122a is representative of the intermediate partial braking positions in which the brake is slipped so as to control speed by braking. The brakes at both sides of the tractor are set to stop the tractor.

INDUCED FLOW FIRST PASSAGES — FIGS. 2, 3, 4, 5

In FIGS. 2 and 3, a ring of six paddle brackets of general U-shape which constantly rotate presents paired leg vanes 178 operating on a dry sump principle to induce flow about the inner circumference of the fixed casing portion 80 in a path to a point where an opening 82 intervenes as an escape port for oil from the housing 62. The designed lubricant level in the rear main frame 14 is indicated by the oil level OL in FIG. 2, which is a considerable distance vertically below the height of first passages defined by the openings 82. Circumferential movement of the paired leg vanes 178 away from the level OL in the direction of the arrow in FIG. 2 toward the nearest spill opening 82 will dispose of the trapped oil. Therefore, the pair of leg vanes 178 upon continued rotation into the position shown in FIG. 3 in the direction of the arrow will be empty of oil.

The paddle brackets, one of which is represented at 180 in FIG. 5, are six in number per ring, equally spaced, and each is secured by two screws 182 to the constantly rotating clutch casing 100. In one physically constructed embodiment of the invention, the tips of the leg vanes 178 were spaced from the inner periphery of the casing portion 80 by a clearance gap CG of 3/16 inch (4.8 millimeters). Oil in the bottom half of the casing portion 80 tends to collect in a shallow pool where it is entrapped in a moving annulus of intervening fluid pockets between the stationary and rotatable casings 80 and 100 and movable by and with the latter due to the brackets 180. The movement is circumferentially up into the upper half of the annulus of fluid pockets, and continues circumferentially so as to spill the oil centrifugally through and out the spill openings which are directly in the path of the ring of vanes 178.

GRAVITY FLOW SECOND PASSAGES — FIGS. 3, 5, 6

In the lower half of the housing 62, the radial attachment flange 174 of the cover 84 is drilled with a semicircle of holes 184 which are generally axially aligned with and covered by blocker portions 186 of the combined bumper-piston-blocker formed by the brake piston 122. The bottom central one of the holes 184 has seven similar holes to one side of it and seven similar holes to the other side of it, all spaced apart approximately 13° center to center, in circular measurement. The location of most of the holes 184 substantially below the level OL creates a gravity head of oil causing the holes to function as second passages for the oil when the piston 122 is going to and fro (broken line position 122a) from full engagement and also while holding the brake fully engaged. A gravity flow of oil therefore follows the arrows 186 in FIG. 6 for cooling and lubrication flow over the multiple brake plates. Draining oil follows the arrow 188 whereupon the oil proceeds in the described induced flow path and through the first passages defined by the spill ports 82.

FIG. 7 illustrates how oil can continually pass between the wear surfaces of fully engaged brake plates, each face of each one 118 of which comprises an endless pattern of intercalated diamond shaped friction engageable lands 190 defined by an interconnected network of face grooves 192, which individually extend generally radially on arcs. Oil enters and thus flows generally radially along such arcs, around each engaged land 190.

Novelty is felt to reside in the drilled holes 184 forming the second passages, and in their interaction with the first passages formed by the openings 82 and with third passages to be described.

The passage means formed by the second hole passages 184 penetrate the attachment flange 174 in a path parallel to the path of reciprocation of the brake piston 122 and in registry with both the brake cylinder chamber 146 and the intervening piston 122. Each point on the collective area of the passage blocker portions 186 confronts and directly "sees" sump oil under gravity head and, at the radius afforded by the "wet" radial attachment flange 174, the cross sectional area available for gravity flow through the second passage means is practically without limit; so upon predetermined initial movement of the brake bumper parts 176 in lifting as a face seal away from the flat radial surface of the flange 174, considerable initial gravity flow results, in contrast to more limited diameter face sealing arrangements involving one or a few longitudinal shaft passages or longitudinal casting passages.

It is evident that chamber pressure in the brake cylinder at 146 rises to the usual high pressure head of brake actuating pressure, readily hydraulically overcoming the combined static head on the area of the blocker portions 186 and mechanical pressure exerted by the brake springs 124 (FIG. 4).

If a continuous circumferential slot is made in the bottom of the attachment flange 174 at the general location of and in place of the drilled holes 184, the slot can be of considerably shorter circular length than the semicircle of holes, and it will eliminate the need for 15 drillings, but it will require being cast into each of the end covers 84 at the bottom thereof as formed. Such a casting and slot will have substantial flow capacity and the slot will readily be blocked by the piston 122 in the same way as the holes.

The fact that the steering clutches of a crawler tractor will be slipped very little when the tractor is pulling out of a deep revine, whereas the brakes will be slipped the entire way into the ravine if the tractor is being braked going down, explains in part why the brake of a clutch-brake unit requires more cooling according to my invention than the clutch. Also, I have observed that the clutch from standpoint of overheating has the advantage that it rotates, thus aiding the oil flow between the clutch plates in cooling same.

FORCED FLOW THIRD PASSAGES — FIGS. 5 AND 6

Pumped oil flows through the shaft central passage 156 and lubricates bearings along its route such as the bearing assembly 116 in the usual way, and also flows through third passages 194, 196, and 198 constantly providing cooling and lubrication flow to both the brake and the clutch. Such flow is supplemented from time to time on the brake only through the holes 184 forming the second inlet passages, while the brake is engaged or going into or out of engagement.

CIRCULATION

The sets of twelve rotating vanes 178 disposed one set in each side of the steering drive 16 act as constant oil slingers, each with spill ports formed by its two openings 82 in the plane of rotation of the slinger. Because of the penetration points of the first openings 82 being always above the lubricant designed level OL (FIG. 2), these openings 82 constantly receive the spill of oil from the rotating annulus of fluid pockets coming from the casing portion 80 and insure valveless circulation of lubricant always one-way from the interior of the housing 62.

The centrifugally spilled oil through the first passages formed by the openings 82 represents all oil discharged, both the intermittent, large in-fed flow to the brake zone from the second passages formed by the holes 184, and the uninterrupted, small, forced-feed flow in the third passages 194, 196 and 198 (FIG. 5) under pressure-feed into the brake and clutch zones.

The second passage penetration points marked by the submerged openings 184 (FIG. 5) are below the designed level OL, not shown. Hence at any time at which the piston 122 is rightwardly moved from its position as shown in FIG. 5, the in-fed flow to the interior of the housing 62 is necessarily confined to the lower half of the latter. However, the ring of fluid pockets defined by the grooves 192 (FIG. 7) of the rotating brake plates 118a (FIG. 5) direct the oil rising from the space CG (FIG. 5), circumferentially up into the upper half of the ring, and thence provide circumferential distribution throughout the upper half of the ring so as to afford cooling and lubrication distribution between the stationary and rotatable plates 118b and 118a in the upper half of the stationary casing portion 80. Oil leaving the grooved plates in the upper half, collects by gravity drainage in a shallow pool in the lower half of the casing portion 80. There is an abundance of oil flow so long as the second passages 184 supplement the third passages 194, 196, 198, and the distribution noted is constant as the plates go to and from full engagement in the brake. When the brakes are fully set so as to allow no relative motion between the plates whatever, there is no appreciable distribution but, then again, there is no friction heat being generated because the brakes are set.

No appreciable quantity of oil is allowed to accumulate in the interior of the housing 62 because the first passage openings 82 promptly return to the wet sump all wet-sump oil which has been in-fed through the second passage holes 184 and the third passages 194, 196 and 198 communicating with the interior of the housing 62. The double walls of the rear main frame 14 serve as an oil-to-air heat exchanger so as to dissipate the heat generated by friction in the steering drive brakes and clutches.

The significance of the control afforded by the brake piston in the broken line and solid line positions as shown in FIG. 6 is that the wear surfaces presented by the friction faces of the disks are not allowed to have damage or excessive wear happen which could occur to them if deprived of an abundance of cooling and lubrication flow. The significance of the control afforded by the brake piston in the solid line position as shown in FIG. 5 is that the limited minimum cooling and lubrication flow permitted decreases fluid friction drag on the moving disks 118a of the brake.

It will be evident that the holes 184 are part and parcel of the already existing attachment flange 174; the spill port openings 82 are part and parcel of the already existing casing portion 80; the blocking portion 186 is part and parcel of the already existing reciprocating brake piston 122; each paddle bracket 180 is affixed so as to become part and parcel of the already existing rotating clutch casing 100; and finally each groove-like distribution pocket in a rotating brake disk 118a is part and parcel of the already existing rotating faces on each side of the disk. So the parts, by innovation, novelly coact in performing their multifunctions, and together produce an overall and practically important new result.

Variations within the spirit and scope of the invention described are equally comprehended by the foregoing description.

What is claimed is:

1. In a vehicle having a frame defining a wet sump and rotatably mounting therein a connected-together output shaft and output member, said shaft being slightly above the designed lubricant level in the wet sump:

an improved fixed drive-housing;

said drive-housing adapted to operate partly immersed in the wet sump and operatively surround the output member in a manner to provide a rotatable mounting for the output member and output shaft;

said drive-housing including therein constantly stationary and constantly rotatable members, selectively actuated clutch-brake friction engaging means which when engaged brake or clutch the output member selectively to the stationary or rotatable member to be set at rest or in motion thereby, and hydraulic pistons including a brake piston for the brake friction engaging means, and effective by selective engagement to actuate the clutch-brake friction engaging means to set the output member at rest or in motion as described;

first induced-flow passage means penetrating through the wall of said housing, and in open communication with the interior of the latter, and effective on the dry sump principle to conduct any accumulated lubricant therefrom for induced discharge into the surrounding wet sump; and second gravity-flow passage means penetrating through the wall of said housing at a submerged point so as to be maintained always below said designed lubricant level, and in controlled communication at said second passage point with the interior of the housing for affording controlled gravity flow of wet sump lubricant in-feed for cooling, and effective to conduct the in-fed flow of lubricant into the driving housing interior to at least said brake friction engaging means for gravity lubrication and cooling of same.

2. The invention of claim 1 including:

a set of oil slinger elements carried on the exterior of said rotatable member in closely spaced apart relation to the interior of the housing, said first passage means in the housing wall lying in receiving relation along the path of rotation and in the plane of rotation of the slinger means, and located at a reception point in the housing wall so as to be above said designed lubricant level to ensure valveless circulation of lubricant always one-way from the housing.

3. The invention of claim 2 characterized by:

the oil slinger element set comprising a ring of fixed paddles about said rotatable member.

4. The invention of claim 1 characterized by:

the brake piston having said second passage penetration point operatively disposed in the housing wall on one side thereof and having the cooled brake friction engaging means operatively disposed on the other side thereof, and with piston travel space therebetween accommodating piston movement toward the housing wall ultimately blocking the second passage means upon release of the brake friction engaging means and away from the housing wall unblocking the second passage means during engagement of the brake friction engaging means.

5. The invention of claim 4 including:

a combined bumper-piston-blocker formed by a portion of the piston, having one face the surface of which presents a pressure-movable piston area effective in causing movement toward the housing wall to overcome piston biasing means, and one face effective in part to cover the second passage penetration point during said movement and in part to bump against the housing wall as a motion stop during said movement.

6. The invention of claim 4 including:

third pressure-flow passage means in open communication with said housing, and effective to conduct an in-fed flow of lubricant into the drive housing interior to at least said brake friction engaging means for forced lubrication and cooling of same independently of, but supplemented by, the second passage means.

7. In a vehicle having a frame defining a wet sump affording a designed lubricant level therein:

an improved fixed drive housing;

said drive housing adapted to operate partly immersed in the wet sump;

said drive housing having a friction-engageable brake zone therein, and having gravity-flow passage means in and penetrating through the wall of the housing at a submerged point so as to be maintained always below said design lubricant level, and in communication at said passage point with the interior of the housing for affording gravity flow of wet sump lubricant in-feed for cooling, and effective to conduct the in-fed flow of lubricant into the drive housing interior to the friction brake zone; and a brake piston arranged in said zone with the passage penetration point operatively disposed in the housing wall facing one piston side so as to be blockable and unblockable by the latter side, and with the friction brake operatively disposed facing the other side of the brake piston so as to be engaged and released by actuation by the latter side, all during brake piston movement between the housing wall and friction brake.

8. The invention of claim 7 including:

induced-flow passage means in and penetrating through the wall of the housing, and in open communication with the interior of the latter, and effective on the dry sump principle to conduct any accumulated lubricant therefrom for induced discharge into the surrounding wet sump.

9. The invention of claim 7 including:

a combined bumper-piston-blocker formed by an integral flange of the brake piston, presenting a face on said other side defining a pressure-movable area effective in causing friction brake releasing movement toward the housing wall to overcome piston biasing means, and a face on said one piston side effective in part to cover the gravity-flow passage penetration point during said movement and in part to bump against the housing wall as a stop during said movement.

10. The invention of claim 7 including:

pressure-flow passage means in open communication with said housing, and effective to conduct an in-fed flow of lubricant into the drive housing interior to said friction brake zone for forced lubrication and cooling in the zone independently of, but supplemented by, the gravity-flow passage means.

11. In the fixed drive housing of a vehicle having a frame defining a wet sump affording a designed oil level therein, the drive housing adapted to operate partly immersed in the wet sump, the improvement characterized by:

the housing presenting to the oil, at least in the lower portion of the housing, a "wet" end cover radial flange, internal brake means having a brake piston arranged for a limited path of travel with the wet end cover flange at one end of the path and a brake cylinder at the other end formed in part by the brake piston, passage means of substantial cross-sectional area penetrating at one or more points through the wet end-cover flange in parallelism with said path and in registry with both the brake cylinder and the intervening brake piston, and inlet-outlet means in communication with, and controlling pressure of, hydraulic fluid inside said brake cylinder for hydraulically controlling travel of the brake piston in the direction of the wet end-cover flange for ultimately blocking the passage means, and in the direction of the brake cylinder for unblocking the passage means.

12. Method of controlling hydraulic flow by use of an internal brake piston having an external "wet" end-cover flange at one end of the piston's path of travel and having a brake cylinder at the other end formed in part by the brake piston, said method comprising the steps of:
- applying gravity fluid pressure under static head against the exterior of the end-cover flange;
- providing in the end-cover flange passage means of substantial cross-sectional area penetrating at one or more points through the end-cover flange in parallelism with said path and in registry with both the brake cylinder and the intervening brake piston; and
- applying and exhausting actuating pressure fluid in the brake cylinder for causing piston-blocking motion in a direction against the gravity fluid flow through the passage means penetrating the end-cover flange and ultimately blocking off the passage means and flow, and unblocking motion in the same direction as the gravity fluid flow, and unblocking the passage means and admitting gravity in-feed of fluid under the static head.

13. In a method of applying cooling and lubrication flow to heat producing friction mechanism, said mechanism being housed by outer and inner parts forming respective stationary and rotatable casings mutually defining fluid pockets in an annulus therebetween, said mechanism comprising cooperating engageable friction brake parts forming respective stationary and rotatable plates mutually defining fluid pockets in a ring therebetween, the steps in said method including:
- setting in motion a moving ring of intervening fluid pockets between the stationary and rotatable plates, and movable with and by the latter;
- setting in motion a moving annulus of intervening fluid pockets between the stationary and rotatable casings, and movable with and by the latter, the stationary casing defining inlet openings confined essentially to the lower half thereof and spill openings confined essentially to the upper half thereof;
- directing inlet oil in a flow path through the inlet openings in the lower half, into the fluid pockets intervening, at a point in the lower half of the ring, thence circumferentially therewith up into the upper half of the ring, thence by circumferential distribution thereby throughout the upper half of the ring, so as to provide cooling and lubrication distribution between the stationary and rotatable plates in the upper half of the stationary casing, and thence by gravity drainage collecting the draining oil in a pool in the lower half of the stationary casing; and
- directing oil collecting in said pool in a flow path into the fluid pockets intervening at a point in the lower half of the annulus, thence circumferentially therewith up into the upper half of the annulus, and thence continuing circumferentially so as to spill centrifugally through and out the spill holes in the upper half of the stationary casing.

14. Flow circulation between wet sump means and dry sump mechanism partially immersed therein, said dry sump mechanism being housed by outer and inner parts forming respective stationary and rotatable casings mutually defining fluid pockets in an annulus therebetween, said mechanism comprising cooperating engageable friction brake parts forming respective stationary and rotatable plates mutually defining fluid pockets in a ring therebetween, said wet sump means having the design level of an oil body contained therein being low enough relative to the stationary casing that the upper half thereof is out of contact with the oil body and at least a portion of the lower half of the stationary casing is immersed therein, said circulation of flow including the steps of:
- setting in motion a moving ring of intervening fluid pockets between the stationary and rotatable plates, and movable with and by the latter;
- setting in motion a moving annulus of intervening fluid pockets between the stationary and rotatable casings and movable with and by the latter, the stationary casing defining inlet openings confined essentially to the lower half thereof and spill ports confined essentially to the upper half thereof;
- directing by gravity head wet-sump oil in a flow path through the inlet openings in the lower half into the fluid pockets intervening at a point in the lower half of the ring, thence circumferentially therewith up into the upper half of the ring, thence by circumferential distribution thereby throughout the upper half of the ring, so as to provide cooling and lubrication distribution between the stationary and rotatable plates in the upper half of the stationary casing, and thence by drainage to points within the lower half of the stationary casing; and
- collecting at said points and directing, by gravity, dry-sump oil in a flow path into the fluid pockets intervening at a point in the lower half of the annulus, thence circumferentially therewith up into the upper half of the annulus, and thence by centrifugal discharge thereby, spilling the oil through and out the spill ports to return to the wet-sump means in completion of the oil circulation.

* * * * *